United States Patent
Andersson Ersman et al.

(10) Patent No.: US 9,494,839 B2
(45) Date of Patent: Nov. 15, 2016

(54) ELECTROCHEMICAL DEVICE MANUFACTURING

(75) Inventors: Peter Andersson Ersman, Finspång (SE); Jun Kawahara, Saitama (JP); Kazuya Katoh, Tokyo (JP); David Nilsson, Vikingstad (SE)

(73) Assignees: ACREO SWEDISH ICT AB, Kista (SE); LINTEC CORPORATION, Tokyo (JP)

( * ) Notice: Subject to any disclaimer, the term of this patent is extended or adjusted under 35 U.S.C. 154(b) by 167 days.

(21) Appl. No.: 14/006,999

(22) PCT Filed: Apr. 4, 2012

(86) PCT No.: PCT/EP2012/056237
§ 371 (c)(1),
(2), (4) Date: Oct. 17, 2013

(87) PCT Pub. No.: WO2012/136738
PCT Pub. Date: Oct. 11, 2012

(65) Prior Publication Data
US 2014/0041213 A1 Feb. 13, 2014

Related U.S. Application Data
(60) Provisional application No. 61/471,855, filed on Apr. 5, 2011.

(30) Foreign Application Priority Data
May 5, 2011 (EP) .................................. 11164936

(51) Int. Cl.
G02F 1/155 (2006.01)
G02F 1/15 (2006.01)
(52) U.S. Cl.
CPC .............. *G02F 1/155* (2013.01); *G02F 1/15* (2013.01); *Y10T 29/49117* (2015.01)

(58) Field of Classification Search
CPC .......... H01M 4/16; H01M 4/22; H01M 4/88; H01M 4/8835; G02F 1/15; G02F 1/155; Y10T 29/49117
See application file for complete search history.

(56) References Cited

U.S. PATENT DOCUMENTS 4,488,781 A 12/1984 Giglia
5,206,756 A 4/1993 Cheshire
(Continued)

FOREIGN PATENT DOCUMENTS

CN 1199408 A 11/1998
CN 1496491 A 5/2004
(Continued)

OTHER PUBLICATIONS

Office Action dated Feb. 24, 2014 issued in Chinese Application No. 201080044527.4—English Translation Only.
(Continued)

*Primary Examiner* — Carl Arbes
(74) *Attorney, Agent, or Firm* — Harness, Dickey and Pierce, P.L.C.

(57) ABSTRACT

A process for manufacturing an electrochemically active device comprising the steps of: —providing a substrate (110) comprising an electrode receiving surface portion (111) having substantially constant wetting tension throughout said electrode receiving surface portion, —providing a plurality of first electrodes (120) directly on said electrode receiving surface portion, —leaving intermediate portions (130) of said electrode receiving surface portion (111) free from said electrodes, —providing a layer of electrolyte (140) covering said plurality of first electrodes (120) and said intermediate portions (130), and—wherein wetting tension of the surfaces of the intermediate portions (130) is arranged to act more repelling on the electrolyte compared to the wetting tension of the surfaces of the plurality of first electrodes (120), whereby, the electrolyte is concentrated to the surfaces of the plurality of first electrodes (120), and the surfaces of the intermediate portions (130) are substantially free of electrolyte.

17 Claims, 6 Drawing Sheets

(56) References Cited

U.S. PATENT DOCUMENTS

| | | | |
|---|---|---|---|
| 6,162,563 A | 12/2000 | Miura et al. | |
| 6,193,912 B1 | 2/2001 | Thieste et al. | |
| 6,524,736 B1* | 2/2003 | Sompalli | C25B 9/10 427/115 |
| 6,639,709 B2 | 10/2003 | Vincent et al. | |
| 6,642,069 B2 | 11/2003 | Armgarth et al. | |
| 6,747,779 B1 | 6/2004 | Morin et al. | |
| 6,879,424 B2 | 4/2005 | Vincent et al. | |
| 7,012,306 B2 | 3/2006 | Armgarth et al. | |
| 7,177,064 B2 | 2/2007 | Park | |
| 7,186,665 B2* | 3/2007 | De Heer | H01G 9/155 361/434 |
| 7,390,528 B2* | 6/2008 | Morii | H01M 4/8605 427/115 |
| 7,396,607 B2* | 7/2008 | Masaka | C08J 5/122 429/483 |
| 7,754,369 B2* | 7/2010 | Starz | H01M 4/881 429/524 |
| 2004/0218346 A1 | 11/2004 | Takeuchi et al. | |
| 2005/0068603 A1 | 3/2005 | Berggren et al. | 359/265 |
| 2005/0275923 A1 | 12/2005 | Park | |
| 2006/0018001 A1 | 1/2006 | Kojima et al. | |
| 2006/0116001 A1 | 6/2006 | Wang | 438/798 |
| 2006/0285190 A1 | 12/2006 | Agrawal et al. | |
| 2007/0138463 A1 | 6/2007 | Herlogsson et al. | |
| 2007/0187242 A1 | 8/2007 | Nair et al. | |
| 2008/0074724 A1 | 3/2008 | Agrawal et al. | |
| 2008/0304132 A1 | 12/2008 | Jung et al. | |
| 2009/0090907 A1 | 4/2009 | Kugler et al. | |
| 2010/0173195 A1 | 7/2010 | Mizuta et al. | |
| 2011/0096388 A1 | 4/2011 | Agrawal et al. | |
| 2012/0081775 A1 | 4/2012 | Ersman et al. | |
| 2013/0128332 A1 | 5/2013 | Andersson Ersman et al. | |

FOREIGN PATENT DOCUMENTS

| | | |
|---|---|---|
| CN | 1498357 A | 5/2004 |
| CN | 1639297 A | 7/2005 |
| CN | 101909823 A | 12/2010 |
| EP | 0 492 387 A2 | 7/1992 |
| JP | 60-217345 A | 10/1985 |
| JP | 61-130929 | 6/1986 |
| JP | 2006-030820 A | 2/2006 |
| JP | 2007-214326 A | 8/2007 |
| JP | 2010-177678 A | 8/2010 |
| WO | WO-02/071139 A1 | 9/2002 |
| WO | WO-02/071505 A1 | 9/2002 |
| WO | WO-02/075442 A1 | 9/2002 |
| WO | WO-2004/114008 A1 | 12/2004 |
| WO | WO-2005/027599 A1 | 3/2005 |
| WO | WO-2005/121882 A1 | 12/2005 |
| WO | WO-2006/085258 A2 | 8/2006 |
| WO | WO-2006/097566 A1 | 9/2006 |
| WO | WO-2007/043419 A1 | 4/2007 |
| WO | WO-2008/066458 A1 | 6/2008 |
| WO | WO 2008/126574 | 10/2008 |
| WO | WO-2008/128726 A1 | 10/2008 |
| WO | WO-2010/003138 A1 | 1/2010 |

OTHER PUBLICATIONS

Panzer, M.J., et al. (2007) "Polymer electrolyte-gated organic field-effect transistors: low-voltage, high-current switches for organic electronics and testbeds for probing electrical transport at high charge carrier density", *J. Am. Chem. Soc.*, 129:6599-6607.
Chinese Office Action dated Mar. 27, 2015 issued in Chinese Application No. 201180047280.6 (English translation only).
U.S. Appl. No. 13/253,179, filed Oct. 5, 2011.
U.S. Appl. No. 13/500,039, filed Aug. 31, 2012.
Brief Communication dated Jun. 22, 2015 issued in European Patent Application No. 11711945.3.
Chinese Office Action dated May 27, 2015 issued in Chinese Application No. 201280025785.7 (English translation only).

Andersson, P., et al. (2007), "Printable all-organic electrochromic active-matrix displays", *Advanced Functional materials*, 17: 3074-3082.
Epstein, A. (1991), "Novel concepts in electronic polymers: polyaniline and its derivatives", *Makromol. Chem., Macromol. Symp.*, 51: 217-234.
Fichou, D. (1999), "Application of electrically conductive polythiophenes", *Handbook of Oligo-and Polythiophenes*, 10: 491-524.
Gustaffson, J.C., et al. (1994), "In situ spectroscopic investigations of electrochromism and ion transport in a poly (3,4-ethylenedioxythiophene) electrode in a solid state electrochemical cell", *Solid State Ionics*, 69: 145-152.
Onoda, M., et al. (1994), Properties of electrochemically cation-doped poly(isothianaphthene), *J. Electrochem. Soc.*, 141(2): 338-341.
Schottland, P., et al. (2000), "Poly(3-4-alkylenedioxypyrrole)s: highly stable electronically conducting and electrochromic polymers", *Macromolecules*, 33: 7051-7061.
Thom, E., et al. (2005) "Replicative generation of metal microstructures by template-directed electrometallization", Applied Physics Letters, 87:24101-1-024101-3.
International Search Report for PCT/EP2012/056237 dated Jun. 12, 2012.
Written Opinion for PCT/EP2012/056237 dated Feb. 28, 2013.
International Preliminary Report on Patentability for PCT/EP2012/056237 dated May 21, 2013.
Office Action dated Sep. 18, 2014 issued in U.S. Appl. No. 13/253,179.
Office Action dated Sep. 30, 2015 issued in U.S. Appl. No. 13/253,179.
Yu, X., et al. (2008), "Fabrication of carbon nanotube based transparent conductive thin films using layer-by-layer technology", *Surface & Coatings Tehcnology*: 202: 2002-2007.
Office Action dated Mar. 20, 2015 issued in U.S. Appl. No. 13/253,179.
Office Action dated Sep. 24, 2014 issued in Japanese Application No. 2013-532084—with English translation.
Aliev, A. E. et al., "Image diffusion and cross-talk in passive matrix electrochromic displays", Displays 23 (2002) 239-247.
Bartlett, P., et al. (2000) "Microelectrochemical enzyme transistors" *Chem. Commun.*, pp. 105-112.
Chen, M. (2005) "Printed electrochemical devices using conducting polymers as active materials on flexible substrates" *Proceedings of the IEEE*, 93(7):1339-1347.
Chinese Office Action dated Feb. 24, 2014 for issued in Chinese Application No. 201080044527.4 (full translation provided).
European Search Report dated Mar. 26, 2010 issed in European Application No. 09 17 2227.
European Search Report dated Jan. 27, 2011 issued in European Application No. 21047271.
International Preliminary Report on Patentability dated Feb. 17, 2012 issued in PCT Application No. PCT/EP2010/064818.
International Search Report and Written Opinion dated May 10, 2011 issued in PCT Application No. PCT/EP2011/055284.
International Search Report and Written Opinion dated Jan. 4, 2011 issued in PCT Application No. PCT/EP2010/064818.
Mabeck, J., et al. (2005) "Microfluidic gating of an organic electrochemical transistor" *Applied Physics Letters*, 87:013503-1-013503-3.
Nilsson, D., et al. (2002) "Bi-stable and dynamic current modulation in electrochemical organic transistors" *Advanced Materials*, 14(1):51-54.
Nilsson, D., et al. (2005) "The electrochemical transistor and circuit design considerations" *ITN*, 3:III/349-III/352.
Office Action dated Apr. 19, 2013 issued in U.S. Appl. No. 13/253,179.
Office Action dated Jan. 9, 2012 issued in European Application No. 21047271.
Office Action dated Oct. 9, 2013 issued in U.S. Appl. No. 13/253,179.

(56) References Cited

OTHER PUBLICATIONS

Panzer, M., et al. (2006) "High carrier density and metallic conductivity in poly(3-hexylthiophene) achieved by electrostatic charge injection" *Advanced Functional Materials*, 16(8): 1051-1056.

Office Action dated Jun. 23, 2016 issued in U.S. Appl. No. 13/253,179.

* cited by examiner

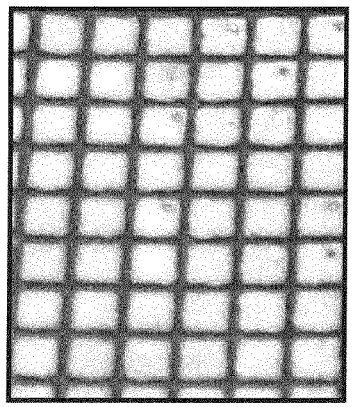
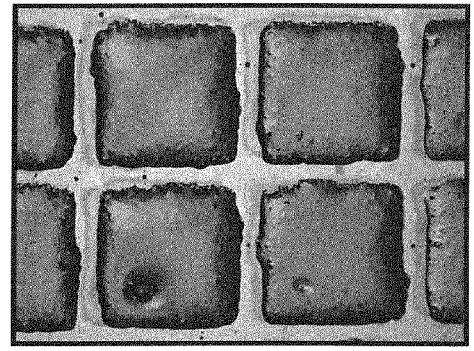
*Fig. 3a*  *Fig. 3a´*
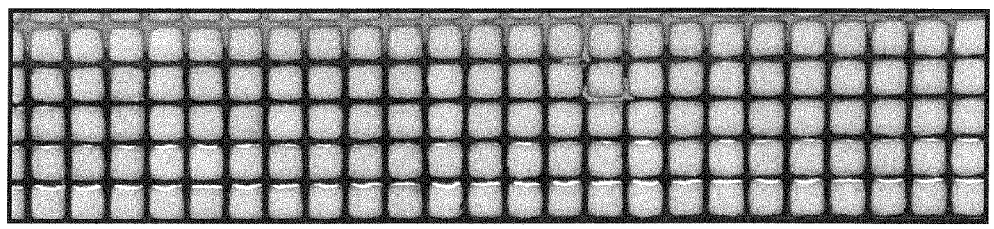
*Fig. 3b*
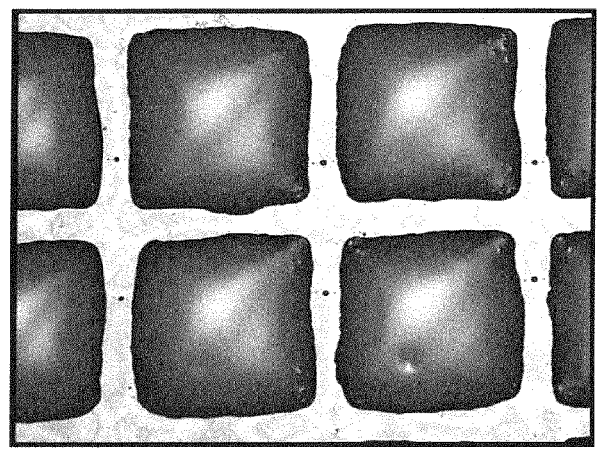
*Fig. 3b´*

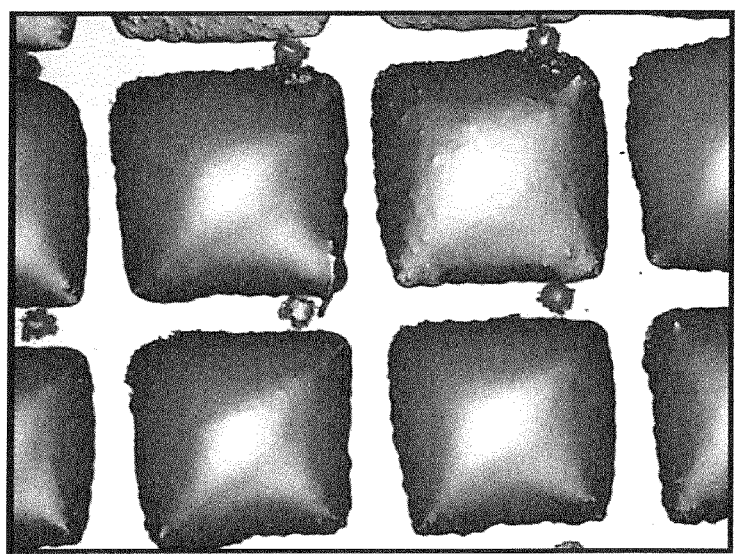
Fig. 4
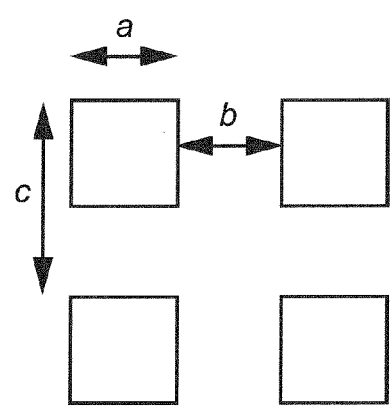
Fig. 5
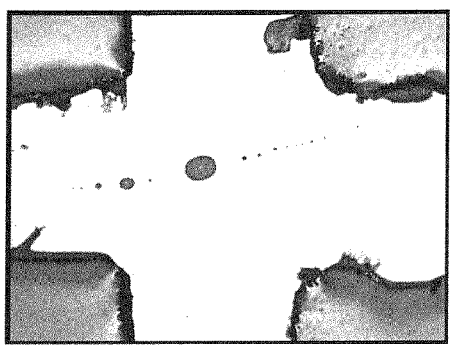 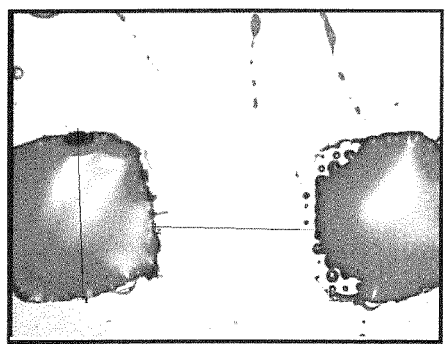
Fig. 6a  Fig. 6b

ELECTROCHEMICAL DEVICE MANUFACTURING

PRIORITY STATEMENT

This application is a national stage application under 35 U.S.C. §371 of PCT International Application No. PCT/EP2012/056237 which has an International filing date of 4 Apr. 2012, and which claims priority under 35 U.S.C. §119 to U.S. Application No. 61/471,855 filed 5 Apr. 2011 and European Application No. 11164936.4 filed 5 May 2011. The contents of each application recited above are incorporated herein by reference in their entirety.

TECHNICAL FIELD

The invention relates to a process for manufacturing at least a part of an electrochemically active device, which comprises an electrolyte in ionic contact with an electrode. The invention also relates to a process for manufacturing a more completed electrochemically active device comprising an electrolyte sandwiched between an active electrode and a counter electrode.

BACKGROUND OF THE INVENTION

Printable display devices have attracted a lot of attention, and a lot of global research efforts have been carried out during the recent years. Regardless of the display performance; short or long life time, high or low resolution, short or long switching time etc., the most critical issue in order to obtain high yield at low production cost has been to establish the most simple manufacturing process by involving as few materials and processing steps as possible. Manufacturing of display devices, which sometimes consist of both pixels and addressing transistors, often requires material patterning at high accuracy on top of a flexible substrate. Such material patterning can, for example, consist of the deposition of the insulating, semiconducting and conducting materials serving as the dielectric, active and electrode materials, respectively, of a display device. One of the major objectives in order to enable manufacturing at low cost and high volume is to combine flexible polymer materials with roll-to-roll printing and/or coating equipments. Therefore, the capability of rapid and simple patterning of deposited materials at high yield is one of the most critical issues that need to be addressed within the field of printed electronics.

One example of a process for manufacturing electrochromic display devices comprising electrolyte is described in Andersson P. et al: "*Printable All-Organic Electrochromic Active-Matrix Displays*", Advanced Functional Materials, vol. 17, no. 16, 5 Nov. 2007, pages 3074-3082. The article describes, in section 4 Experimental, the manufacturing of an electrochromic device comprising electrolyte, wherein transistor and pixel electrodes are formed on two PEDOT:PSS-covered sheets by means of subtractive patterning, i.e. predetermined portions of the PEDOT:PSS layer are removed such that the desired PEDOT:PSS electrodes are formed. Two masks are made by cutting openings in a plastic foil. When ready, each mask is arranged on a respective one of the PEDOT:PSS-covered sheets, and the mask openings are filled with electrolyte using e.g. a screen printer squeegee. Hence, the electrolyte is arranged in ionic contact with each PEDOT:PSS layer. Finally, the two sheets are laminated together, such that ionic contact is provided between a display electrode and/or a transistor channel on the first sheet and a display counter electrode and/or a transistor gate electrode on the other sheet via the electrolyte, as is illustrated in FIG. 4a in the article.

Although good results may be achieved by the above manufacturing process there is a desire to enhance the pixel resolution and preferably also to reduce the manufacturing time. However, the plastic foil limits the pixel to pixel distance. If the pixels are made substantially smaller (e.g. in the order of 1 $mm^2$) and arranged substantially closer to each other (e.g. having a pixel to pixel distance in the order of less than 500 μm, the stability of the foil will be severely impaired due to lack of stabilizing material.

In US 20060116001, from the remote technical field of pixels devoid of electrolyte material, there is described a method wherein a stamp is arranged in contact with a substrate for a substantial amount of time (according to the example given: two days), which stamp modifies the surface energy of a substrate such that when the substrate is later dip-coated in a conjugated polymer solution, the conjugated polymer wets and spreads only on the area with higher surface energy. However, this technique is not relevant for achieving the objects of the invention, e.g. to that there is no guidance in the document as how this technique, relating to devices having a layer of semiconducting or a light emitting material applied to polymer, may be modified so as to be applicable to the manufacturing of a display comprising layers of electrolyte sandwiched between pairs of two electrodes/display elements; and also due to the substantial amount of time the stamp needs to be in contact with the substrate—the demands for high yield and short manufacturing time do not normally allow for a manufacturing step which takes days to complete. Furthermore, the requirement of a pre-patterned material layer implies an additional processing step during the display device manufacturing, which in turn increases the risk of registration errors.

SUMMARY OF THE INVENTION

One object of the invention is to overcome or at least alleviate the above mentioned drawbacks.

This and other objects are met by the subject matters provided in the independent claims. Preferred embodiments of the invention are presented in the dependent claims.

According to a first aspect thereof, the invention relates to a process for manufacturing of a part of at least an electrochemically active device comprising:
  providing a substrate comprising an electrode receiving surface portion having substantially constant wetting properties or wetting tension throughout said electrode receiving surface portion,
  providing a plurality of first electrodes directly on said electrode receiving surface portion having substantially constant wetting tension,
  leaving intermediate portions of said electrode receiving surface portion free from said electrodes, wherein each intermediate portion is usually arranged spatially between at least a pair of two first electrodes,
  providing a layer of electrolyte directly on each one of said plurality of electrodes,
wherein
  the electrolyte is applied as a layer covering said plurality of first electrodes and said intermediate portions, and
  the wetting tension of the surfaces of the intermediate portions is arranged to act more repelling on the electrolyte compared to the wetting tension of the surfaces of the plurality of first electrodes, whereby, at least after a predetermined time period and at least throughout a first portion of the substrate, the electrolyte is concentrated to the surfaces of the plurality of first electrodes, and the surfaces of the intermediate portions are substantially free of electrolyte.

The inventors were developing a self patterning method (i.e. a method of coating an electrode carrying substrate with electrolyte, where the electrolyte initially covers both the electrodes and the portions in between the electrodes, and thereafter automatically is rearranged such that it mainly covers only the electrodes and not the surfaces in between) and experimenting with different coatings to apply on the portions of the substrate not covered by electrodes in order to achieve an efficient self patterning, when they made the surprising observation that it was possible to achieve a self patterning without any coating on the substrate at all.

The inventors tried many substrate/electrode/electrolyte combinations, but saw initially no pattern in the working and non-working combinations. They soon realised that there were a vast amount of parameters that could affect the patterning behaviour of the electrolyte (such as e.g. adhesion energy and surface free energy of the substrate and electrode material; droplet contact angle, polarity, rheology, dispersing factor and hydrogen bonding for different electrolytes, and also the granular size of ingredients in the electrolytes as well as the length of the polymer chain of the different electrolyte compositions), and a prediction of how to select the substrate/electrode/electrolyte combination in order to obtain a high self patterning yield was not easily identifiable.

After a thorough investigation of the results of different substrate/electrode/electrolyte combinations the inventors have come to a first conclusion that one type of working substrate/electrode/electrolyte combination fulfils the following relation: the substrate have a wetting tension [N/m], which is lower than or equal to the corresponding surface tension [N/m] of the electrolyte, which in turn is lower than or equal to the wetting tension [N/m] of the electrodes. Additionally, the electrolyte is a printable electrolyte.

The inventors have also come to a second conclusion that a second type of working substrate/electrode/electrolyte combination fulfils the following conditions: the adhesion energy of the surface of the electrodes is larger than 10 mJ/m$^2$ relative deionized water, and test mixtures prepared according to ISO 8296:2003 (E) and having a surface tension larger than 38 mN/m and smaller than 63 mN/m are repelled from the substrate. Additionally, the electrolyte is a printable electrolyte.

The adhesion energy of a surface may be determined by arranging a water droplet of deionized water on the surface, which adhesion energy is to be measured, and to tilt the surface gradually until the droplet starts to slip down; then the angle of the test surface against the horizontal ground is recorded. Finally, the adhesion energy of the test surface relative the deionized water droplet is calculated using the formula of; $E=(mg \cdot \sin \alpha)/(2\pi r)$. Here r is the radius of the droplet on the substrate, m is the weight of the droplet, g is the acceleration of gravity and $\alpha$ is the angle of the tilted substrate when the droplet starts to slip down.

The invention resides in an insight by the inventors that it is possible to achieve self alignment of an electrolyte when producing a part for an electrochemically active device, without any local pre-treatment of the substrate surface. Thus, the invention facilitates the manufacturing of e.g. pixelated electrochemical devices, by e.g. reducing the number of processing steps and providing a way of aligning the electrolyte to the electrodes setting aside the need for registration.

In order to prevent cross-talk between the electrodes in e.g. pixelated electrochemical devices, it is preferred that all intermediate portions are substantially free of electrolyte. In other word, after the self alignment process each electrode is preferably ionically isolated from the rest of the electrodes. Further, when an electrolyte having an ideal thickness is applied, this results in all intermediate portions on the substrate being free of electrolyte. Furthermore, when a substantially thicker electrolyte is applied, this may result in that only a part of the intermediate portions become free of electrolyte. However, by selecting and/or extracting and/or isolating surface areas of the substrate where the intermediate portions are substantially free of electrolyte, these areas can be used in electrochemically active devices and provide a device which is not hampered by ionic connection between electrodes in the same plane. In other words, when producing a part of an electrochemically device, the yield of the production process may vary dependent on e.g. the thickness of the applied electrolyte layer. A yield of 100% corresponds to a device wherein all intermediate portions are substantially free of electrolyte. A yield of 70% corresponds to a device wherein 70% of the intermediate portions are substantially free of electrolyte.

When a surface area of the substrate is selected, one identifies a portion of the substrate having a desirable yield and isolates or extracts this portion from the remaining portion of the substrate, in order to provide the portion of the substrate having a desirable yield for use in an electrochemically active device. In relation to this invention the term electrochemically active device refers to a device having at least one electrochemically active component comprising an electrolyte ionically connecting an electrochemically active material to an electrode, also referred to as a counter electrode. Basic examples of electrochemically active components, e.g. a display or a transistor, are described e.g. in Andersson P. et al: "*Printable All-Organic Electrochromic Active-Matrix Displays*", which article is discussed in more detail in the background section of this document.

In relation to this invention the term part of an electrochemically active device refers to an electrochemically active device, which is or is not fully assembled. In a fully assembled device the electrolyte may be sandwiched between a first and a second electrode, while in a not fully assembled device the second electrode may still not have been applied. The electrochemically active device must comprise the electrolyte and the first electrode, but there may be alternative ways of completing the device other than applying a second electrode. Moreover, the electrolyte is preferably in ionic contact with both the first electrode (121) and the second electrode (122) of the respective pairs of one first electrode (121) and one second electrode (126).

In relation to this invention the term electrode receiving surface refers to the portion of the substrate to which the plurality of first electrodes, or the first set of electrodes, is to be applied. The electrode receiving surface has not been exposed to a pre-treatment, resulting in a varying wetting distribution or surface energy distribution across the surface, before the electrodes are provided to the surface. One example of a pre-treatment of the substrate resulting in a varying surface energy distribution is described in US 20060116001. In other words, when the set of first electrodes is applied to the substrate, the surface energy and the wetting properties are substantially uniform throughout the entire electrode receiving surface of the substrate.

In relation to this invention the expression a surface having a substantially constant wetting tension throughout the surface, refers to that the wetting tension is substantially uniform all over the surface. In other words, if the electrolyte is applied directly on that surface the wetting or dewetting of the electrolyte will not result in a predetermined pattern. Instead, the electrolyte will rather rupture into a random pattern. According to one example the wetting tension of the surface does not vary more than 20 mN/m throughout the surface. According to another example it does not vary more than 15 mN/m, or more than 10 mN/m, or more than 5 mN/m, or more than 2 mN/m, or more than 1 mN/m throughout the surface having a substantially constant wetting tension.

In relation to this invention the expression that a first object, A, is provided directly on a second object, B, means that there is no intermediate object, C, arranged between the first and second objects A, B. However, when a first object, A, is described as being provided on a second object, B, there may be one or more intermediate objects, C, D, arranged between the first and second objects A and B.

In relation to this invention the expression a plurality of first electrodes refers to a set of electrodes comprising at least two first electrodes, and for example at least four, or at least 5×7 electrodes arranged in a matrix configuration or at least 25, or at least 64, or at least 128, or at least 512 or more first electrodes. The expressions a plurality of second electrodes and a plurality of any other entities are to be interpreted in an analogous manner.

In relation to this invention the term substantially free of electrolyte refers to that the amount of electrolyte on an intermediate portion is small enough, such that the two or four electrodes neighbouring the intermediate portion may still work well enough.

According to some examples, the predetermined time period after which the electrolyte is concentrated to the surfaces of the plurality of first electrodes, and the surfaces of the intermediate portions are substantially free of electrolyte is equal to 5 minutes, equal to 3 minutes, equal to 2 minutes, equal to 1 minute, equal to 30 seconds, equal to 15 seconds or equal to 10 seconds, or equal to 5 seconds or equal to 1 second. The predetermined time period is measured from said electrolyte being provided directly on a set of first electrodes and said intermediate surface portions. In more detail, the expression that an area is substantially free of electrolyte at least after 5 minutes, refers to that the area is substantially free of electrolyte within a time period of 0 to 5 minutes.

According to a second aspect thereof, the invention relates to a process for manufacturing of at least a part of an electrochemically active device comprising:
providing a substrate comprising an electrode receiving surface portion having substantially constant wetting properties or wetting tension throughout said electrode receiving surface portion,
providing a plurality of first electrodes directly on said electrode receiving surface portion having substantially constant wetting tension,
leaving intermediate portions of said electrode receiving surface portion free from said electrodes, wherein each intermediate portion is usually arranged spatially between at least a pair of two first electrodes,
providing a layer of electrolyte directly on each one of said plurality of electrodes,
wherein
the electrolyte is applied as a layer covering said plurality of first electrodes and said intermediate portions, and comprising
providing a self-alignment of the electrolyte driven by a more repelling interaction between the electrolyte and the surfaces of the intermediate portion, compared to the interaction between the electrolyte and the surfaces of the plurality of first electrodes, whereby at a completion of the self-alignment of the electrolyte, the electrolyte is concentrated to the surfaces of the plurality of first electrodes and the surfaces of the intermediate portions are substantially free of electrolyte.

In other words there is a self-controlled deposition of the electrolyte on the electrodes. In yet other words, the electrolyte will be substantially or totally confined to the electrode surfaces. Hence, there is provided a patterning method in which an electrolyte may self-separate into a predetermined pattern, which pattern is guided by the pattern or lay-out of the electrodes.

According to one example, the surface tension of the electrolyte and wetting tension of the first electrodes are selected such that the electrolyte is attracted to the electrodes. This is advantageous as it normally results in a higher yield.

According to a third aspect thereof, the invention relates to a process for manufacturing of at least a part of an electrochemically active device comprising:
providing a substrate (110) comprising an electrode receiving surface portion (111) having a substantially constant first wetting tension throughout said electrode receiving surface portion,
providing a plurality of first electrodes (120) directly on said electrode receiving surface portion having a substantially constant first wetting tension, wherein the surfaces of said plurality of electrodes have a second wetting tension,
leaving intermediate portions (130) of said electrode receiving surface portion (111) free from said electrodes,
providing a printable electrolyte (140) having a first corresponding surface tension,
arranging said printable electrolyte as a layer of electrolyte (140) directly on each one of said plurality of electrodes,
wherein
the electrolyte (140) is applied as a layer covering said plurality of first electrodes (120) and said intermediate portions (130),
said first wetting tension of said substrate is lower than or equal to said first corresponding surface tension of said electrolyte, and
said second wetting tension of said electrodes is higher than said first corresponding surface tension of said electrolyte.

Hence, after a completion of the self-alignment of the electrolyte, the electrolyte is concentrated to the surfaces of the plurality of first electrodes and the surfaces of the intermediate portions are substantially free of electrolyte According to a fourth aspect thereof, the invention relates to a process for manufacturing of at least a part of an electrochemically active device comprising:
providing a substrate comprising an electrode receiving surface portion having substantially constant wetting properties or wetting tension throughout said electrode receiving surface portion,
providing a plurality of first electrodes directly on said electrode receiving surface portion having substantially constant wetting tension,
leaving intermediate portions of said electrode receiving surface portion free from said electrodes, wherein each intermediate portion is usually arranged spatially between at least a pair of two first electrodes, providing a layer of electrolyte directly on each one of said plurality of electrodes, wherein the electrolyte is applied as a layer covering said plurality of first electrodes and said intermediate portions, and the surface properties of the first electrodes, or the material or composition of the first electrodes are/is selected such that test mixtures prepared according to ISO 8296:2003 (E) and having a surface tension equal to 73 mN/m are attracted to the electrodes, and the surface properties of the electrode receiving surface portion is selected such that test mixtures prepared according to ISO 8296:2003 (E) and having a surface tension larger than 38 mN/m and smaller than 63 mN/m are repelled from the electrode receiving surface portion.

In relation to the aspects presented above and according to one example, the electrolyte has a corresponding surface tension which is higher than 38 mN/m, or higher than 42 mN/m, or higher than 50 mN/m, or higher than 60 mN/m.

In relation to the aspects presented above and according to one example the electrolyte has a corresponding surface tension which is equal to or lower than 73 mN/m, or equal to or lower than 63 mN/m, or equal to or lower than 50 mN/m.

In relation to the aspects presented above and according to one example, the electrolyte has a corresponding surface tension which is between 38 mN/m and 73 mN/m, or which is between 42 mN/m and 73 mN/m, or which is between 38 mN/m and 62 mN/m, or which is between 42 mN/m and 63 mN/m, or which is 43 mN/m and 73 mN/m, or which is between 43 mN/m and 63 mN/m, or which is between 42 mN/m and 62 mN/m.

According to one wetting tension example, the material or composition of the electrode receiving surface portion, or the surface properties of the electrode receiving surface portion, is/are selected such that test mixtures prepared according to ISO 8296:2003 (E) and having a surface tension larger than 38 mN/m and smaller than 57 mN/m are repelled from the electrode receiving surface portion.

According to another wetting tension example, the material or composition of the electrode receiving surface portion, or the surface properties of the electrode receiving surface portion is/are selected such that test mixtures prepared according to ISO 8296:2003 (E) and having a surface tension ranging from 40 to 50 mN/m are repelled from the electrode receiving surface portion.

According to a third wetting tension example, the material or composition of the electrode receiving surface portion, or the surface properties of the electrode receiving surface portion is/are selected such that test mixtures prepared according to ISO 8296:2003 (E) and having a surface tension ranging from 40 to 45 mN/m are repelled from the electrode receiving surface portion.

The intervals mentioned above are advantageous as they normally result in high yield.

In relation to this invention the term test mixtures prepared according to ISO 8296:2003 (E) and having a surface tension range from xx to yy mN/m refers to liquids prepared according to Section 5 "Test mixtures" of the ISO document, which liquids have a surface tension of xx to yy mN/m according to Table 1 of the ISO document.

According to a fifth aspect thereof, the invention relates to a process for manufacturing of a part of an electrochemically active device comprising:

providing a substrate comprising an electrode receiving surface portion having a substantially constant wetting tension throughout said electrode receiving surface portion, providing a plurality of first electrodes directly on said electrode receiving surface portion having substantially constant wetting tension, leaving intermediate portions of said electrode receiving surface portion free from said electrodes, wherein each intermediate portion is usually arranged spatially between at least a pair of two first electrodes, providing a layer of electrolyte directly on each one of said plurality of electrodes, wherein the electrolyte is applied as a layer covering said plurality of first electrodes and said intermediate portions, and the adhesion energy of the surface of the printed first electrodes is larger than 10 mJ/m$^2$ relative deionized water, and the surface properties of the electrode receiving surface portion is selected such that test mixtures prepared according to ISO 8296:2003 (E) and having a surface tension larger than 38 mN/m and smaller than 63 mN/m are repelled from the electrode receiving surface portion.

According to one example, the surface properties of the electrode receiving surface portion is selected such that test mixtures prepared according to ISO 8296:2003 (E) and having a surface tension larger than 38 mN/m and smaller than 57 mN/m are repelled from the electrode receiving surface portion.

According to another example, the surface properties of the electrode receiving surface portion is selected such that test mixtures prepared according to ISO 8296:2003 (E) and having a surface tension ranging from 40 to 50 mN/m are repelled from the electrode receiving surface portion.

According to a third example, the surface properties of the electrode receiving surface portion is selected such that test mixtures prepared according to ISO 8296:2003 (E) and having a surface tension ranging from 40 to 45 mN/m are repelled from the electrode receiving surface portion.

According to a sixth aspect thereof, the invention relates to a process for manufacturing of at least a part of an electrochemically active device comprising:

providing a substrate comprising an electrode receiving surface portion having substantially constant wetting properties or wetting tension throughout said electrode receiving surface portion, providing a plurality of first electrodes directly on said electrode receiving surface portion having substantially constant wetting tension, leaving intermediate portions of said electrode receiving surface portion free from said electrodes, wherein each intermediate portion is usually arranged spatially between at least a pair of two first electrodes, providing a layer of electrolyte directly on each one of said plurality of electrodes, wherein the wetting tension of the electrode receiving surface portion acts repelling on said electrolyte, and the wetting tension of said electrodes acts wetting on said electrolyte.

Examples of advantageous embodiments of the aspects present above are given below.

In relation to the aspects presented above, the substrate is formed of a first composition or material having a first wetting tension. Additionally or alternatively, the electrodes are formed of a second composition or material having a second wetting tension.

In relation to the aspects presented above, and at a completion of the self-alignment of the electrolyte, the electrolyte is concentrated to the surfaces of the plurality of first electrodes and the surfaces of the intermediate portions are substantially free of electrolyte.

According to one example the electrodes having a thickness of e.g. between 0.01 and 100 µm, or between 0.05 and 50 µm, or between 1 and 20 µm, or between 1 and 15 µm. In other words, the thickness of the electrodes is normally at least 0.05 µm, or at least 0.1 µm or at least 0.5 µm or at least 1 µm. Alternatively or additionally, the thickness of the electrodes is at most 100 µm, or at most 50 µm, or at most 30 µm or at most 15 µm, or at most 10 µm. One printed electrode layer may e.g. be between 1 and 10 µm thick and a number of layers may be printed on top of each other. In relation to this invention the thickness of the electrodes are measured in a direction normal to the substrate surface.

According to one example the electrolyte has a thickness of e.g. between 1 and 200 µm, or 5 and 150 µm, or 5 and 115 µm, or 10 and 100 µm, or 10 and 70 µm, or 10 and 60 µm. In other words, the thickness of the electrolyte is normally at least 1 µm, or at least 5 µm, or at least 10 µm, or at least 15 µm. Additionally or alternatively, the thickness of the electrolyte is at most 200 µm, or at most 150 µm, or at most 115 µm, or at most 100 µm, or at most 70 µm, or at most 60 µm.

All the figures for the electrolyte thickness in the section above refer to the thickness of the electrolyte when wet (or just applied). After the electrolyte has dried it is normally thinner. In relation to this invention the thickness of the electrolyte is measured in a direction normal to the substrate surface.

According to one example the viscosity of the electrolyte is lower than 7 000 mPa s, or lower than 6 000 mPa s, or lower than 3 000 mPa s, or lower than 1 000 mPa s, or lower than 500 mPa s.

According to one example said substrate is flexible. This is advantageous as it allows for e.g. a roll-to-roll production process.

According to one example, said layer of electrolyte is applied as one unitary layer covering said plurality of first electrodes and said intermediate portions. A unitary electrolyte layer is advantageous as it facilitates the application of the electrolyte layer.

Moreover, said layer of electrolyte is usually applied as a substantially uniform layer. This is advantageous as it normally produces a device having an equal amount of electrolyte on each electrode, i.e. the performance of two such electrodes are normally more similar, compared to electrodes being covered by a substantially different amount of electrolyte.

One way of providing a substantially unitary and uniform layer of electrolyte is by the use of wire-bar coating, which facilitates high volume manufacturing.

In relation to this invention the term unitary layer refers to a continuous layer, which is continuous at least until it starts to dewet or rupture.

In relation to this invention the term uniform layer refers to a layer having a substantially even thickness, at least until it starts to dewet or rupture.

According to one example the application of the layer of electrolyte further comprises self-alignment of said electrolyte layer, which arranges the electrolyte on the surfaces of said plurality of first electrodes and substantially not on the surfaces of the intermediate portions.

According to one example, a second set of electrodes is provided to said electrolyte, such that said electrolyte is sandwiched between a pair of a first electrode and a second electrode. Moreover, the electrolyte is preferably in ionic contact with both the first electrode and the second electrode in the pair of one first electrode and one second electrode.

According to one example said plurality of first electrodes and/or said plurality of second electrodes and/or said layer of electrolyte is provided by means of printing or coating, and preferably is provided by means of a technique selected from a group comprising screen printing, wire-bar coating, knife coating, bar coating, spin coating, dip coating or spray coating. This is advantageous as it normally allows for short manufacturing times.

According to one example the electrolyte is arranged such that it dissociates into smaller and substantially larger ion-complexes, where the smaller ion-complexes have a first electric charge and the larger ion-complexes have the opposite electric charge. The larger ion-complexes preferably comprise long polymer chains or large molecules, and are preferably cations. In other words, according to one preferred example the electrolyte is a polyelectrolyte or an oligomeric electrolyte comprising larger cation-complexes.

According to one example the layer of electrolyte comprises cations and anions, wherein a major part of the anions have a substantially smaller molecular weight compared to the largest of the cations.

According to one example, the method further comprises the step of selecting, extracting or cutting out said first portion of the substrate from the rest of the substrate, for use in an electrochemically active device. Normally, the selected first portion of the substrate comprises at least 5×7 electrodes arranged in a matrix configuration. It may also comprise several such 5×7 units, e.g. 25×7 electrodes, or 100×35 electrodes.

According to one example there is provided a process for manufacturing an electrochemically active device comprising:

manufacturing of a part of an electrochemically active device as described above;

providing a plurality of second electrodes, wherein said layer of electrolyte is sandwiched between pairs of one first electrode and one second electrode. In other words, in the electrochemical device respective portions of the electrolyte layer is sandwiched between pairs of one first electrode and one second electrode. In more detail, said one first electrode is selected from said plurality of first electrodes of said electrochemically active device described above, and said one second electrode is selected from said provided plurality of second electrodes. Furthermore, the electrolyte may provide an ionic connection between said pairs of one first electrode and one second electrode, e.g. by being arranged in direct ionic contact with first and second electrodes.

The second electrodes may be provided by means of e.g. a printing method as described for said first electrode. The second electrodes may also be applied by means of lamination, i.e. the second electrodes are printed on a separate substrate which is thereafter laminated on the substrate whereon said first electrodes are provided. In this case, the deposition of a conducting material, e.g. a transparent metal oxide or a conducting polymer, might be required before printing said second electrodes in order to establish electrical connection to each second electrode.

According to one example each one of said first electrodes comprises electrochemically active material or is electrochemically active. Additionally or alternatively each one of said first electrodes comprises electrochromic material or is electrochromic. Additionally or alternatively, each one of said first electrodes is arranged of electrochemically active material comprising electrochemically active material and/or electrochromic material.

DEFINITIONS

In addition to what have been explained above in relation to different expressions, the following also applies in relation to this invention.

Electrochemically active: an "electrochemically active" layer or an "electrochemically active" material according to the present invention, is a piece of a material having the ability of electrochemically altering its redox state. The change of redox state may be achieved by oxidation or reduction reactions, for example, by applying a potential difference across the electrochemically active material, wherein at least a portion of the electrochemically active material is in ionic contact with an electrolyte. For example, the electrochemically active material may be a material which has the ability of electrochemically altering its electrical conductivity through change of redox state thereof. The electrochemically active material may be patterned and/or printed into different shapes, and is composed of one material or a combination of materials. The material(s) may be organic or inorganic, molecular or polymeric. Independent of if the electrochemically active material is composed of one material or is an ensemble of more than one material, at least one material is electronically conducting in at least one oxidation state. The electrochemically active material may also be an electrochromic material which has the ability of electrochemically altering its color through change of redox state thereof. The features of the electrochemically active material may be used in e.g. sensing devices, optoelectronic devices, actuators, wettability switching, and microfluidic devices, the list is not exhaustive. The electrochemically active layer may furthermore be coupled to an electrode, being composed of the same or different materials.

Electrochromic: an "electrochromic" layer or an "electrochromic" material in relation to this invention is a continuous geometrical body, which can be patterned and/or printed into different shapes, and is composed of one material or a combination of materials. The material(s) may be organic or inorganic, molecular or polymeric. Such an electrochromic element, whether it is composed of one material or is an ensemble of more than one material, combines the following properties: at least one material is electrically conducting in at least one oxidation state, and at least one material is electrochromic, i.e. exhibits color change as a result of electrochemical redox reactions within the material. Optionally, the electrochromic layer or material may comprise an electrochemically active material.

Contact portion: as used herein, a contact portion of an electrochemically active layer is a portion of the layer which surface on at least one side of the layer is in direct contact with electrolyte, i.e. shares a common interface with an electrolyte.

Color change: when reference is made to "color change", this include changes in optical density or reflectance, so that "color change" for example takes into account changes from blue to red, blue to colorless, colorless to blue, dark blue to light blue, grey to white or dark grey to light grey alike.

Electrochromic display: an "electrochromic display" is in relation to this invention a device comprising a plurality of electrochromic pixel elements, wherein each pixel element comprises an electrolyte sandwiched between e.g. a pixel electrode and a counter electrode, wherein at least said pixel electrode is arranged of electrochromic and electrochemically active material. A pixel element may be operated by applying a potential difference between the pixel electrode and the counter electrode, wherein the potential difference controls an electrochemical reaction. In turn, the electrochemical reaction controls, or results in, the coloring or de-coloring of the pixel element. The pixel element is normally arranged such that a color change of the electrochromic element is visually detectable in reflection and/or in transmission.

Solidified electrolyte: for the purposes of the invention, "solidified electrolyte" means an electrolyte that is solid or semi-solid and which at the temperatures at which it is used is sufficiently rigid that particles/flakes in the bulk therein are substantially immobilized by the high viscosity/rigidity of the electrolyte and that it does not flow or leak. For example, such an electrolyte has the proper rheological properties to allow for application of this material on a support in an integral sheet or in a pattern, for example by conventional printing or coating methods. After deposition, the electrolyte formulation should solidify upon evaporation of solvent or because of a chemical cross-linking reaction, brought about by additional chemical reagents or by physical effect, such as irradiation by ultraviolet, infrared or microwave radiation, cooling or any other such. The solidified electrolyte may for example comprise an aqueous or organic solvent-containing gel, such as gelatin or a polymeric gel. However, solid polymeric electrolytes are also contemplated and fall within the scope of the present invention. Furthermore, the definition also encompasses liquid electrolyte solutions soaked into, or in any other way hosted by, an appropriate matrix material, such as a paper, a fabric or a porous polymer.

Electrodes: "electrodes" in devices according to the invention are structures comprising electronically conducting material and which structures may be connected to e.g. a portion of an electrochemically active layer which portion in turn may be in direct contact with the electrolyte. Alternatively, at least a portion of the electrode may also be in direct contact with the electrolyte. The electrodes of the device are typically used for connecting the device to a power source, or may also be used to connect the device as a component in an electrical circuit, or in connection with other circuit components. Electrodes may be used to facilitate a matrix configuration of a plurality of devices, such as an active matrix addressed configuration of devices. In addition, an electrode may also be composed of the same material or similar material as the pixel electrode or the counter electrode and therefore form a continuous, or unitary, piece of material which is electrically conducting and comprises a portion that is in direct contact with the solidified electrolyte. Hence, the electrochemically active material, or layer, may at least partly form an electrode; or a portion of an electrochemically active material may form a portion of an electrode which thereby forms a conductive path to an electrochemically active region of the device. For example, by applying a first electrical potential in an electrode of the device, such as the first electrode of the device, and applying a different potential to the second electrode of the device, a potential difference is provided in the device and the redox state of the electrochemically active device may be controlled and switched.

Layer: according to some embodiments, the electrochemically active device has a laminate structure and consists of "layers" of different materials. These layers can be continuous or patterned, and can be applied to each other (self-supporting device) or to a support or carrier (supported device). The layers may be flexible. Furthermore, the term layer may encompass all elements of the same material in the same plane, regardless whether this material is patterned or interrupted in such a way as to form discontinuous "islands" in the plane.

Direct electrical contact: Direct physical contact (common interface) between two phases (for example between electrolyte and electrode) that allows for the exchange of charges through the interface. Charge exchange through the interface can comprise transfer of electrons between electrically conducting phases, transfer of ions between ionically conducting phases, or conversion between electronic current and ionic current by means of electrochemistry at an interface between for example active layer and electrolyte or electrolyte and electrochromic element.

Direct electronic contact: Direct physical contact (common interface) between two phases (for example active layer and electrode) that allows for the exchange of electrons through the interface. Charge exchange through the interface can comprise transfer of electrons between electrically conducting phases.

Direct ionic contact: Direct physical contact (common interface) between two phases that allows for electrochemical reactions, such as redox reactions, i.e. reduction or oxidation reactions.

Corresponding surface tension: A liquid or composition having a corresponding surface tension equal to X [N/m], will hold together for more than 2 s when arranged on a substrate having a wetting tension [N/m] higher than or equal to X [N/m] as determined in accordance with ISO 8296:2003 (E), and break up when arranged on a substrate having a wetting tension [N/m] lower than X [N/m]. The liquid or composition should be applied on the substrate in accordance with points 7.1 and 7.2 of ISO 8296:2003 (E).

The term corresponding surface tension is intended to be used for liquids and compositions where the viscosity is substantially higher than the viscosity of the test liquids described in ISO 8296:2003 (E). Due to the high viscosity no simple determination/measurement of the surface tension can be made, therefore the term corresponding surface tension is used. However, the corresponding surface tension of a liquid or composition is easily determined by applying the liquid or composition on different substrates having a known wetting tension, in analogy with the same stepwise manner described in ISO 8296:2003 (E) for determining the wetting tension.

For a liquid or composition having a measurable surface tension, the corresponding surface tension of that liquid or composition is equal to the surface tension of that liquid. In general, the corresponding surface tension of a liquid/composition may be increased by adding to the liquid/composition a solvent having a higher surface tension than the liquid/composition; and decreased by removing solvent from the liquid/composition, or by adding to the liquid/composition a solvent having a lower surface tension than the liquid/composition. Naturally, the selected solvent should be compatible with the liquid/composition.

Materials

According to one example, the solidified electrolyte comprises a binder. For example, the binder has gelling properties and is e.g. selected from the group consisting of gelatine, a gelatine derivative, polyacrylic acid, polymethacrylic acid, poly(vinylpyrrolidone), polysaccharides, polyacrylamides, polyurethanes, polypropylene oxides, polyethylene oxides, poly(styrene sulphonic acid), and salts and copolymers thereof; and may optionally be cross-linked. The solidified electrolyte may further comprise an ionic salt, for example magnesium sulphate if the binder employed is gelatine. The solidified electrolyte may further contain a hygroscopic salt such as magnesium chloride to maintain the water content therein. Independent of if the solidified electrolyte comprises a binder, it may comprise a polymer having quaternary ammonium groups, such as polymers bearing imidazolium groups. Examples are polyquaternium grades, preferably copolymers with quaternized vinylimidazole units, such as Luviquat Excellence provided by BASF.

The electrochemically active device may comprise, as electrochemically active material, a polymer which may be electrically conducting and/or electrochromic in at least one oxidation state, and optionally also comprises a polyanion compound.

Electrochemically active polymers for use in the electrochemically active device of the invention are for example selected from the group consisting of polythiophenes, polypyrroles, polyanilines, polyisothianaphthalenes, polyphenylene vinylenes and copolymers thereof, such as described by J C Gustafsson et al in Solid State Ionics, 69, 145-152 (1994); Handbook of Oligo- and Polythiophenes, Ch 10.8, Ed D Fichou, Wiley-VCH, Weinhem (1999); by P Schottland et al in Macromolecules, 33, 7051-7061 (2000); by M Onoda in Journal of the Electrochemical Society, 141, 338-341 (1994); by M Chandrasekar in Conducting Polymers, Fundamentals and applications, a Practical Approach, Kluwer Academic Publishers, Boston (1999); and by A J Epstein et al in Macromol Chem, Macromol Symp, 51, 217-234 (1991). In an embodiment, the electrochemically active polymer is a polymer or copolymer of a 3,4-dialkoxythiophene, in which said two alkoxy groups may be the same or different or together represent an optionally substituted oxy-alkylene-oxy bridge. In yet an embodiment, the polymer is a polymer or copolymer of a 3,4-dialkoxythiophene selected from the group consisting of poly(3,4-methylenedioxythiophene), poly(3,4-methylenedioxythiophene) derivatives, poly(3,4-ethylenedioxythiophene), poly(3,4-ethylenedioxythiophene) derivatives, poly(3,4-propylenedioxythiophene), poly(3,4-propylenedioxythiophene) derivatives, poly(3,4-butylenedioxythiophene), poly(3,4-butylenedioxythiophene) derivatives, and copolymers therewith. Charge neutrality of the chemically doped electrochemically active polymer is maintained by, for example, a polyanion compound such as poly(styrene sulfonate) sodium salt. As is readily appreciated by the skilled man, the electrochemically active layer may comprise any non-polymer material, combination of different non-polymer materials, or combination of polymer materials with non-polymer materials, which may exhibit conductivity in at least one oxidation state, and optionally electrochromic behavior. For example, one could use a composite of an electrically conducting material and an electrochromic material, such as electrically conductive particles such as tin oxide, ITO or ATO particles with polymer or non-polymer electrochromic materials such as polyaniline, polypyrrole, polythiophene, nickel oxide, polyvinylferrocene, polyviologen, tungsten oxide, iridium oxide, molybdenum oxide and Prussian blue (ferric ferrocyanide). As non-limiting examples of electrochemically active material mention can be made of: a piece of PEDOT-PSS, being both conducting and electrochromic; a piece of PEDOT-PSS with $Fe^{2+}/SCN^-$, PEDOT-PSS being conducting and electrochromic and $Fe^{2+}/SCN^-$ being an additional electrochromic component; a piece composed of a continuous network of conducting ITO particles in an insulating polymeric matrix, in direct electrical contact with an electrochromic WO3-coating; a piece composed of a continuous network of conducting ITO particles in an insulating polymeric matrix, in contact with an electrochromic component dissolved in an electrolyte. According to one embodiment of the present invention, an electrochromic pixel device may comprise a further electrochromic material for realization of displays with more than one color. This further electrochromic material can be provided within the electrochromic pixel element or the solidified electrolyte, which then for example comprises an electrochromic redox system, such as the redox pair of colorless $Fe^{2+}$ and SCN− ions on one hand, and of red $Fe^{3+}$ (SCN)(H2O)5 complex on the other. By way of further, non-limiting examples, such materials may be selected from different phenazines such as DMPA—5,10-dihydro-5,10-dimethylphenazine, DEPA—5,10-dihydro-5,10-diethylphenazine and DOPA—5,10-di-hydro-5,10-dioctylphenazine, from TMPD—N,N,N',N'-tetramethylphenylenediamine, TMBZ—N,N,N',N'-tetramethylbenzidine, TTF—tetrathiafulvalene, phenanthroline-iron complexes, erioglaucin A, diphenylamines, p-ethoxychrysoidine, methylene blue, different indigos and phenosafranines, as well as mixtures thereof.

The properties of the electrochemically active material in the electrochemically active device may be used for sensor applications, opto-electronic devices, actuators, wettability switching, and microfluidic devices. In addition, the electrochemically active devices according to the present invention may find various applications in the field of printed electronics, for example ranging from sensors and single pixel devices to logic circuits and large active matrix addressed display systems, the listing is not exhaustive.

Generally, other objectives, features, and advantages of the present invention will appear from the following detailed disclosure, from the attached dependent claims as well as from the drawings.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIGS. 3a-3d are photos of parts of an electrochemically active device being produced with varying electrolyte thickness, FIG. 4 is a photo of a part of an electrochemically active device, FIG. 5 illustrates four electrodes and different measures used herein, FIGS. 6a and 6b illustrate two results of different electrode distances.

DETAILED DESCRIPTION OF EMBODIMENTS

Figure 1A:
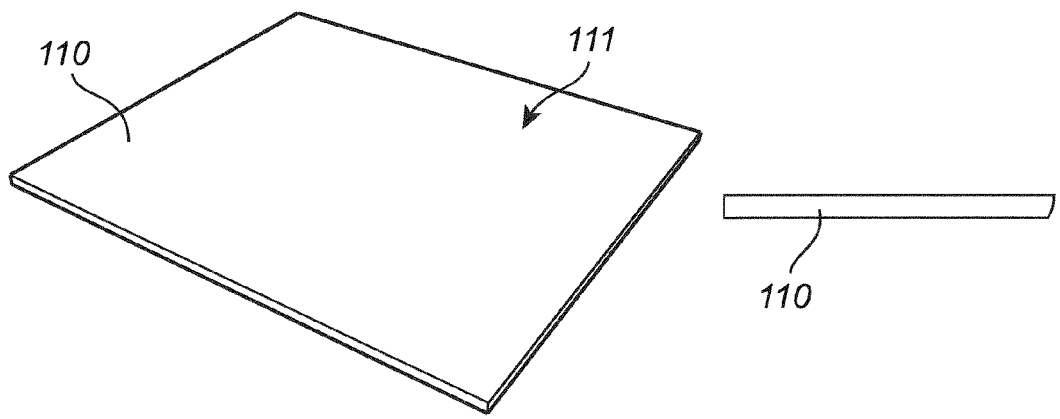
FIGS. 1a-1f are schematic drawings illustrating photos taken of the production process.

FIGS. 1 a-e are a schematic illustration of a process for manufacturing at least a part of an electrochemically active device 100. In all these figures a three dimensional view is presented to the left, and a cross-section of the three dimensional view to the right. In FIG. 1a, a substrate 110 is provided comprising an electrode receiving surface portion 111, which electrode receiving surface portion has a substantially uniform wetting distribution or wetting tension. According to this example the substrate is a flexible PET-foil. Thereafter, FIG. 1b, a plurality of first electrodes 120 are provided directly on the electrode receiving surface portion 111 of said substrate 110 by conventional means. The first electrodes 120 are provided in a predetermined pattern, e.g. in a matrix configuration here comprising equally spaced rows and columns, leaving intermediate portions 130 or intermediate substrate portions 130 between the electrodes. When the electrodes are arranged in a matrix configuration as illustrated in FIG. 1b, the intermediate portions are arranged in intermediate rows separating the electrode rows from each other; and arranged in intermediate columns separating the electrode columns from each other. In a matrix configuration the distances between two adjacent rows may vary throughout the matrix, and the distances between two adjacent columns may also vary. Further, the angle between a crossing row and column may be orthogonal or non-orthogonal. In the current example there is an equal distance between all adjacent rows and columns, respectively, and the angle between all pairs of crossing rows and columns is orthogonal. The intermediate portions 130 are free of electrodes, i.e. the intermediate portions are not covered by any electrodes. Following this, an amount of electrolyte 141 is provided, as illustrated in FIG. 1c, and the electrolyte 141 is applied as a layer of electrolyte 140 covering said plurality of first electrodes 120 and said intermediate portions 130 of the substrate, as illustrated in FIG. 1d. The wetting properties or surface tension of the electrolyte 140 and the wetting properties or wetting tension of the substrate are selected such that the electrolyte is repelled from said intermediate portions of said substrate, making the intermediate portions of said substrate substantially free of electrolyte, as illustrated in FIG. 1e.

Figure 1B:
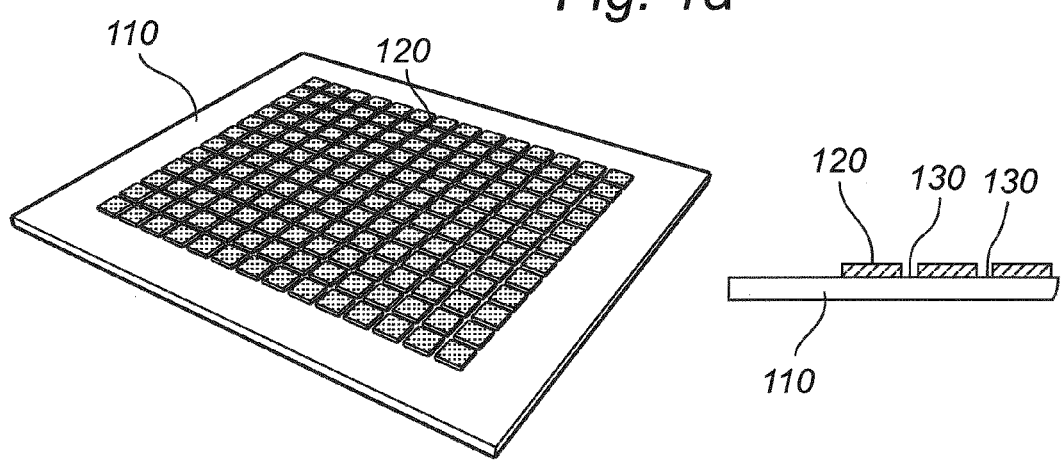
Figure 1C:
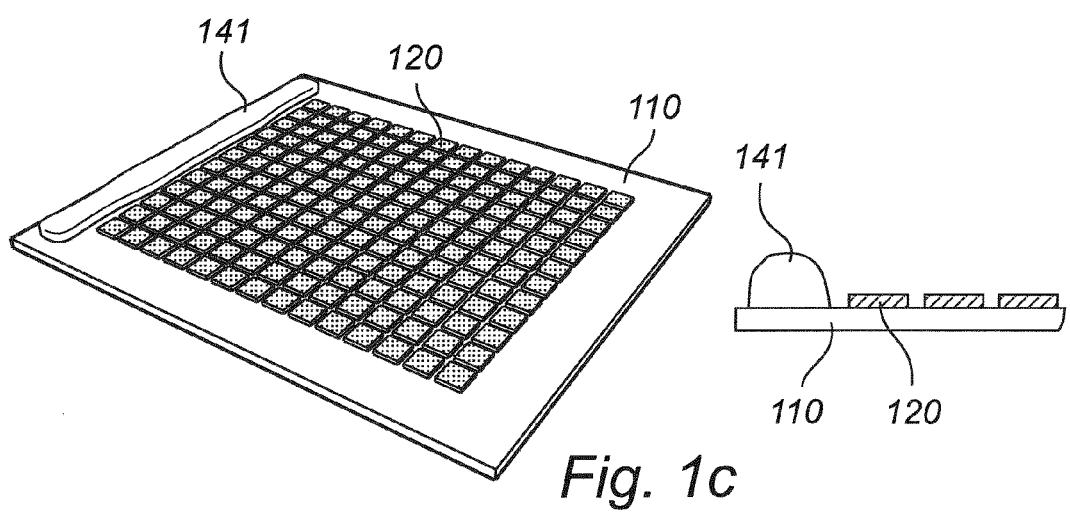
Figure 1D:
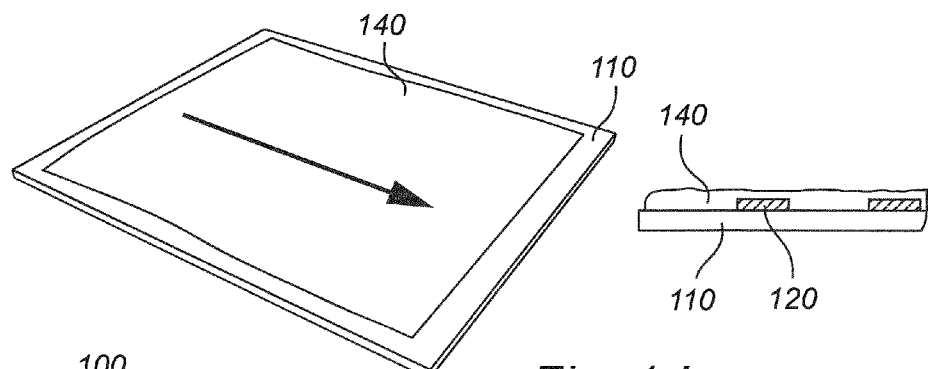
Figure 1E:
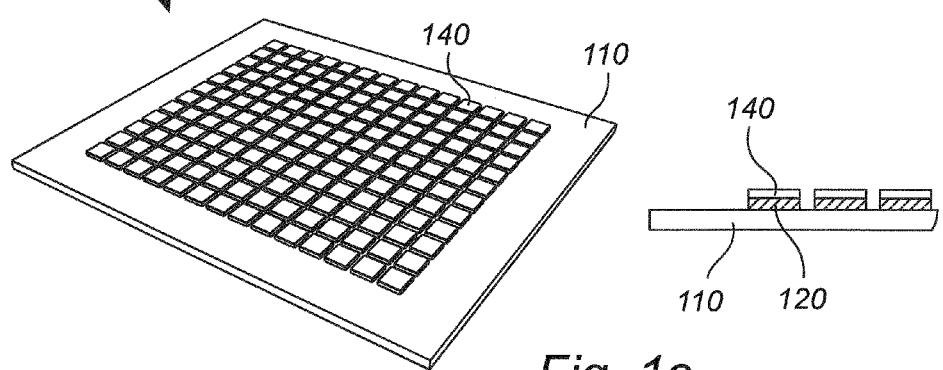

Above has been described the manufacturing process of at least a part of an electrochemically active device consisting of a substrate 110, a plurality of first electrodes 120, and a layer of electrolyte 140 covering said plurality of first electrodes, as illustrated in FIG. 1e.

Figure 1F:
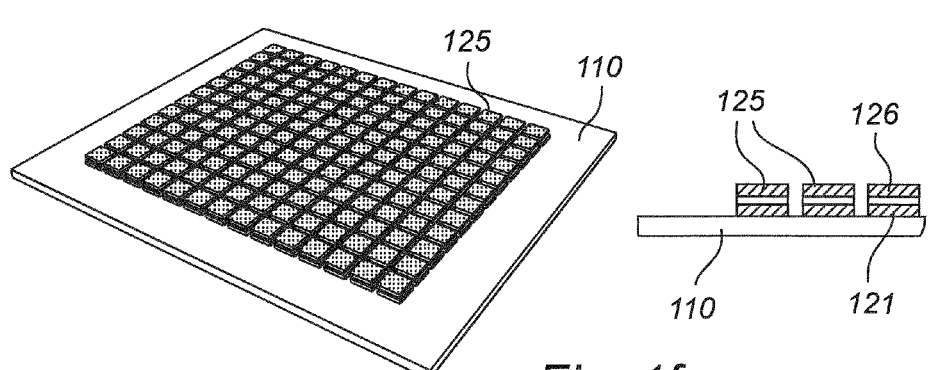

To obtain an electrochemically active device, which may be electrically controlled, a plurality of second electrodes 125 are provided on top of said layer of electrolyte, as illustrated in FIG. 1f. In FIG. 1f, each electrolyte layer portion 126 is arranged between a respective pair of one first electrode 121 and one second electrode 126. To achieve an electrochemically active device, at least one of the electrodes 121, 126 in each pair of electrodes must be arranged of electrochemically active material. In order to achieve an electrochromic pixel device or a display, at least one of the electrodes 121, 126 in each pair of electrodes must be arranged of electrochromic and electrochemically active material. In order for the colour change to be visible, any layer covering the electrode is at least partly transparent.

Figure 2A:
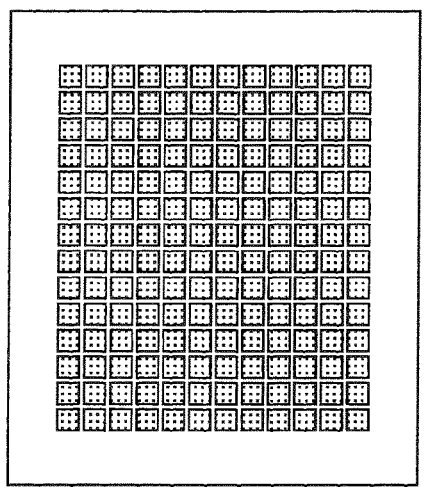
FIGS. 2a-2e are schematic drawings illustrating photos taken of the production process, and more specifically illustrating the alignment of the electrolyte to the electrodes.
Figure 2A:
Figure 2B:
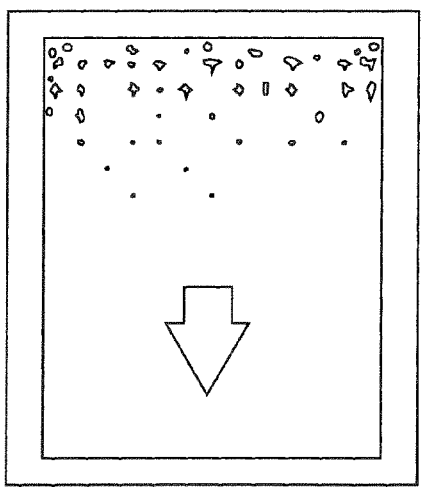
Figure 2B:
Figure 2C:
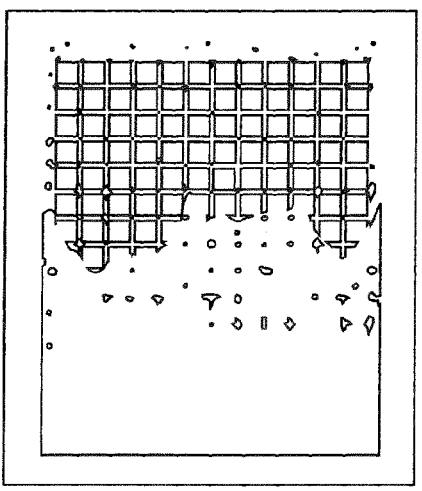
Figure 2C:
Figure 2D:
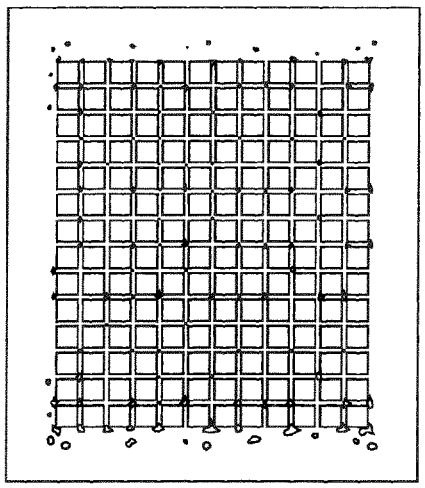
Figure 2D:
Figure 2E:
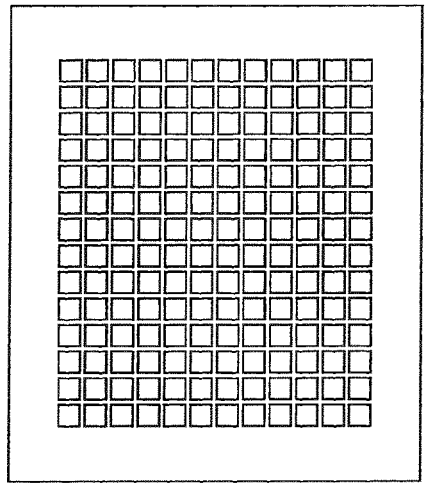
Figure 2E:

FIGS. 2a-2e illustrates the self-controlled deposition process, or the automatic alignment process, of the electrolyte on the electrode surfaces. FIG. 2a illustrates the substrate after the electrodes have been applied, i.e. the same state as illustrated in FIG. 1b. At this instance, the time recording begins, T=0 seconds. At T=5 seconds, the application of the electrolyte is initiated; a predetermined amount of electrolyte is uniformly applied as a unitary layer on the electrode surfaces and on the intermediate substrate portions. FIG. 2b illustrates the situation when the electrolyte has just been applied, T=6 seconds. As can be seen in the figure the electrolyte layer has started to split up at those intermediate portions where the electrolyte was first applied, the rest of the layer is still unitary. At T=7 seconds about half of the intermediate portions are substantially free of electrolyte, the electrolyte layer has started to split up at the intermediate portions which are arranged substantially at the middle of the matrix, while the electrolyte layer is still unitary at those intermediate portions where the electrolyte layer was last applied, this is illustrated in FIG. 2c. FIG. 2d illustrates the situation at T=9 seconds, where substantially all the intermediate portions are free of electrolyte. FIG. 2e illustrates the situation at T=10 seconds, where all intermediate portions are free of electrolyte, the electrolyte being confined to the electrode surfaces. Hence, this arrangement is the same as the one illustrated in FIG. 1e. As can be seen in the FIGS. the electrolyte adheres to the electrodes, which attract the electrolyte, and is repelled from the intermediate substrate portions.

EXPERIMENTS

Self-Alignment Test

All samples were prepared according to the following: All materials were used with neither pre-treatment nor purification. Each printed material was patterned into 64×64 squares by using screen printing, by using a 120/34 mesh consisting of 120 threads/cm with a thread diameter of 34 μm, on a plastic substrate, where each square had an area of approximately 0.8×0.8 mm$^2$ and a pitch equal to 1 mm. Drying or curing of the printed material, typically at 100° C. during 5 minutes, was followed by bar-coating of a uniform electrolyte layer by using wire-bar #4 (manufactured by R. D. Specialties, Inc.), which results in a wet thickness of approximately 10 μm. The electrolyte was prepared with approximately 10 wt.-% of TiO$_2$ powder, KRONOS 2300 manufactured by KRONOS, for whiteness and opaqueness (detailed electrolyte compositions is given below). Finally, the self-alignment capability was evaluated by observing whether the electrolyte layer could be automatically patterned on top of the squares of the printed material or not.

The substrates, printed materials and electrolytes are referred to as follows. Substrate:
(A) Melinex 454 PET film (manufactured by DuPont, 50 μm thickness)
(B) DIAFOIL T100G PET foil (manufactured by Mitsubishi Polyester film Corporation, 75 μm thickness)
(C) Coated side of the COSMOSHINE A4100 PET foil (manufactured by TOYOBO Co, Ltd., 50 μm thickness)
(D) Uncoated side of the foil (C)

Printed material:
(a) 7102 Carbon Conductive Composition (paste manufactured by DuPont)
(b) ELECTRODAG PF-407A (manufactured by Acheson, conductive carbon paste)
(c) CLEVIOS S V3 (manufactured by Heraeus, conductive PEDOT:PSS screen printing paste)
(d) Ag5000 (manufactured by DuPont, conductive silver screen printing paste)
(e) 20 wt. % carbon black (ENSACO conductive carbon black powder manufactured by Timcal)/20 wt. % poly-vinyl butyral (MOWITAL B20H manufactured by Kuraray)/60 wt. % dilutant (Thinner 3610 manufactured by DuPont)

Electrolyte:
(1) Poly(vinylpyrrolidone)-co-(vinyl-3-methyl imidazolium chloride) (Luviquat Excellence distributed by BASF, 40 wt. % solid content dissolved in water, M.W.=40000, Poly(vinylpyrrolidone)(VP)/vinyl-3-methyl imidazolium chloride (VI)=5/95)
(2) Poly(diallyl dimethyl ammonium chloride) (distributed by Sigma-Aldrich, M.W.=400000-500000, 20 wt. % solid content dissolved in water)
(3) Sodium poly(styrene sulfonate) (distributed by Alfa Aesar, M.W.=70000, 40 wt. % solid content dissolved in water)
(4) Poly(styrene sulfonic acid) (distributed by Polyscience, M.W.=70000, wt. % solid content dissolved in water)
(5) (5) 1-ethyl-3-methylimidazolium ethyl sulfate, including 5 wt. % hydroxyethyl cellulose By visual inspection the following conclusions were drawn with respect to the resulting yield for different combinations of substrates and electrodes, as noted in Table Ia and Ib:

TABLE Ia

Visual inspection of self alignment test

| | | Substrate | | | |
|---|---|---|---|---|---|
| Electrolyte 1 | | (A) M454 | (B) T-100G | (C) A4100 coat | (D) A-4100 uncoat |
| Electrode | (a) 7102 | 100 | 0 | 0 | 30-40 |
| | (b) PF-407A | 100 | 0 | 0 | 30-40 |
| | (c) S V3 | 90-100 | 0 | 0 | 0 |
| | (d) Ag5000 | 90 | 0 | 0 | 70-80 |
| | (e) ENSACO C | 90 | | | |

TABLE Ib

Visual inspection of self alignment test

| | Electrolyte | | | |
|---|---|---|---|---|
| Substrate A | 2 | 3 | 4 | 5 |
| Electrode (a) 7102 | 100 | 0 | 0 | 0 |

The values are defined in %-scale, where 0% and 100% correspond to no self-alignment and complete self-alignment, respectively.

The wetting tensions of different substrates were determined by following ISO 8296:2003 (E), and the results are indicated in Table II.

TABLE II

Wetting Properties

| | | Adhesion energy relative water (mJ/m2) | Wetting Tension (mN/m) |
|---|---|---|---|
| Electrode | (a) DuPont "7102 Carbon Conductive Composition" | 10.9 | >73.0 |
| | (b) Acheson "ELECTRODAG PF-407A" | 10.7 | >73.0 |
| | (c) Heraeus "CLEVIOS S V3" | 5.9 | >73.0 |

TABLE II-continued

Wetting Properties

|  |  | Adhesion energy relative water (mJ/m2) | Wetting Tension (mN/m) |
|---|---|---|---|
| Substrate | (d) DuPont silver conductor paste "Ag5000" | 11.5 | 35.0 |
|  | (e) ENSACO Carbon | 11.4 | 49.0 |
|  | (A) DuPont "Melinex454" | 7.9 | 42.0 |
|  | (C) T-100G | 4.9 | >73.0 |
|  | (D) A-4100 coated surface | 7.4 | 63.0 |
|  | (E) A-4100 PET surface | 7.1 | 38.0 |

A wetting tension being referred to as >73.0 mN/m indicates that even when a test mixture having a surface tension of 73.0 mN/m was applied on the substrate, the liquid film held together for more than 2 seconds. A wetting tension of 35.0 mN/m indicates that when a test mixture having a surface tension of 35.0 mN/m or higher was applied on the substrate, the liquid film broke up in less than 2 seconds.

Also the electrodes are referred to as having a wetting tension. The wetting tension for an electrode material is determined in an analogous way as for the substrates. I.e. layers of the electrode material are applied to a surface, and the same type of test mixtures as described in ISO 8296: 2003(E) are applied to the surface in accordance with the instructions therein.

The adhesion energy relative deionized water is measured by a dynamic contact angle meter (Dropmaster DM-701, manufactured by Kyowa Interface Science Co., Ltd.), wherein the sliding method is used for determination of the values. In more detail, in this method the adhesion energy of a test surface is measured by putting a deionized water droplet on the test surface, and gradually tilting the test surface until the droplet started to slip down; then the angle of the test surface against the horizontal ground is recorded, and finally the adhesion energy of the test surface relative deionized water is calculated using the formula of; $E=(mg \cdot \sin \alpha)/(2\pi r)$. Here r is radius of the droplet on the test surface, m is the weight of the droplet, g is the acceleration of gravity and $\alpha$ is the angle of the tilted test substrate when the droplet starts to slip down.

By visual inspection the following conclusions were drawn with respect to the resulting yield when different dilutions of Luviquat Excellence (electrolyte (1)) were used, as noted in Table III:

| Amount Luviquat Excellence (%) | Solid content dissolved in water (wt. %) | Viscosity (mPa s) | Visual inspection of SEP |
|---|---|---|---|
| 100.0 | 40.0 | 310 | 100 |
| 95.0 | 42.1 | 420 | 100 |
| 90.0 | 44.4 | 780 | 100 |
| 85.0 | 47.1 | 1650 | 95-100 |
| 80.0 | 50.0 | 3500 | 95-100 |
| 77.5 | 51.6 | 5190 | 95 |
| 75.0 | 53.3 | 7410 | 90 |
| 67.8 | 59.0 | >10000 | 0 |

Visual inspection of surface energy patterning (SEP): the values are defined in %-scale, where 0% and 100% correspond to no self-alignment and complete self-alignment, respectively.

As is known in the art, electrolytes having a viscosity higher than about 7 000 mPa s are not printable. In relation to this inventions, a printable electrolyte means an electrolyte which is uniformly coatable and/or uniformly printable by conventional coating and/or printing means; such printable electrolytes have a viscosity which is lower than 7 000 mPa s. Additionally, and as is readily seen in the table, the higher the viscosity the lower the yield; at least when the viscosity is higher than about 800 mPa s.

The experiment reported in Table III was performed by first measuring the viscosity of undiluted Luviquat Excellence, and visually determining its yield in a self alignment test when coated on a substrate type (A) carrying electrodes of type (a).

The viscosity was measured by means of Digital Rotothinner 455N/65, manufactured by Sheen Instruments, except for the electrolyte sample having a solid content of 59, which was measured by a Sine-Wave Vibro Viscometer, Sv-10. The viscosity limits for the two viscometers is approximately 7 000 mPa s and approximately 10 000 mPa s, respectively. None of the instruments were able to give a result for the electrolyte sample having a solid content of 59. Hence, all that can be said of the viscosity of that electrolyte is that it is higher than 10 000 mPa s.

Additionally, measurements have been made in order to determine the corresponding surface tension of the Electrolytes (1) to (5). 5 samples of each of the Substrates (A) to (D) were provided, and one sample of each substrate was coated with a respective one of said Electrolytes (1) to (5). The applied electrolyte layer had an approximate thickness of 18 µm when wet.

The performance of the respective electrolytes on the respective sample is presented in Table IV.

TABLE IV

|  |  | Electrolytes | | | | |
|---|---|---|---|---|---|---|
| Substrate | Wetting tension (mN/m) | (1) LQ | (2) PDMAC | (3) PSSNa | (4) PSSH | (5) EMIES-HEC |
| (A) M454 | 42 | Rupture | Rupture | Wet | Wet | Wet |
| (C) T-100G | >73 | Wet | Wet | Wet | Wet | Wet |
| (D) A4100 (Ct) | 63 | Wet | Wet | Wet | Wet | Wet |
| (E) A4100 (un-Ct) | 38 | Rupture | Rupture | Wet | Wet | Wet |

As explained above the wetting tension of a surface may be determined by arranging test liquids having different surface tensions on the surface, starting with a test liquid having a low surface tension, which wets the surface, and gradually applying test liquids having a higher surface tension until the liquid breaks up within 2 s after the application thereof. In other words, when the surface tension of the liquid exceeds the wetting tension of the surface, it breaks up.

As can be seen in the table, electrolyte (1) breaks up when being arranged on substrate (A) having a wetting tension of 42 mN/m or substrate (E) having a wetting tension of 38 mN/m; but wets when it is arranged on substrate (C) having a wetting tension higher than 73 mN/m or substrate (D) having a wetting tension of 63 mN/m. Consequently, the corresponding surface tension of electrolyte (1) is higher than 38 and 42 mN/m; and lower than or equal to 63 and >73 mN/m, i.e. between 43 and 63 mN/m.

Furthermore, electrolyte (3) does not break up on any of the substrates; but wets on all of them. Consequently, the corresponding surface tension of electrolyte (3) is higher than 73 mN/m.

In summary, the following conclusions of the corresponding surface tension can be drawn:

Electrolytes (1) and (2) have a corresponding surface tension which is higher than 42 mN/m and lower than 63 mN/m;

Electrolytes (3), (4) and (5) have a corresponding surface tension which is higher than 73 mN/m.

The inventors have learnt that the thickness of the applied electrolyte has an effect on the yield of the manufacturing process is determined. The devices illustrated in FIGS. 3a-3d were all produced using substrate (A) Melinex 454 provided with electrodes (e) carbon paste 7102 and applying electrolyte (1) Luviquat. The samples were all prepared as described in relation to the self alignment-test, except that the electrolyte thickness varied for each sample. A first sample having an electrolyte wet film thickness of about 9 μm is illustrated by a photograph in FIG. 3a, and with a microscope close up in FIG. 3a'. As can be seen in the FIGS. all electrodes are ionically isolated from each other, making the yield 100%. In other words, all electrodes are useable.

A second sample having an electrolyte wet film thickness of about 27 μm is illustrated by a photograph in FIG. 3b, and with a microscope close up in FIG. 3b'. As can be seen in the FIGS. all electrodes are ionically isolated from each other, making the yield 100%.

Figure 3C:
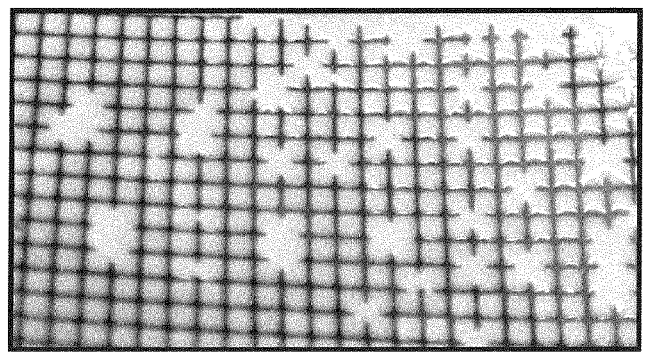

A third sample having an electrolyte wet film thickness of about 60 μm is illustrated by a photograph in FIG. 3c, and with a microscope close up in FIGS. 3c' and 3c". FIG. 3c' illustrates an area of the sample where six electrodes are ionically isolated from each other. In FIG. 3" five of the electrodes are ionically connected to each other by the electrolyte. Most of the intermediate portions shown in FIG. 3c" are not substantially free of electrolyte. In summary, as can be seen in the FIGS. most electrodes are ionically isolated from each other, and the yield is estimated to >90%. In other words, >90% of the electrodes are not in ionic contact with any other electrode.

Figure 3D:
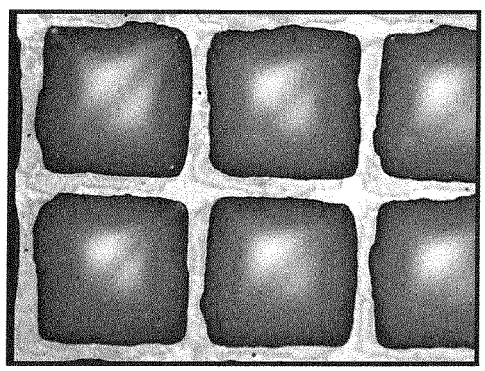
Figure 3D:
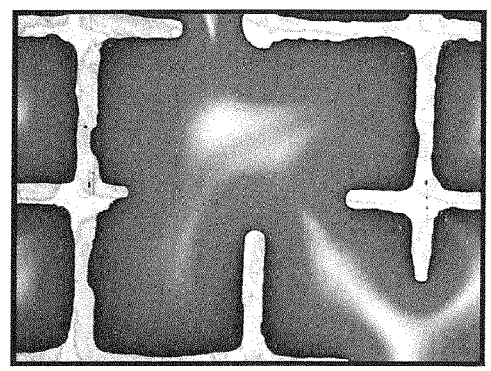
Figure 3D:
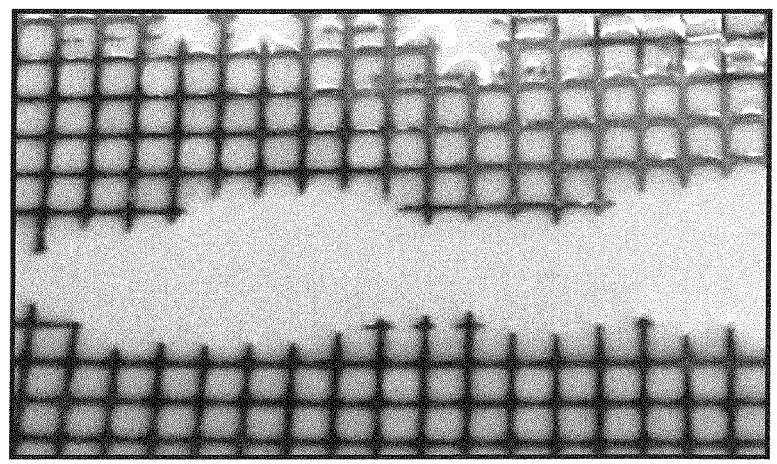

A fourth sample having an electrolyte wet film thickness of about 115 μm is illustrated by a photograph in FIG. 3d. As can be seen in the FIGS. many of the electrodes are ionically isolated from each other, and the yield is estimated to 70%. In other words, 70% of the electrodes are not in ionic contact with any other electrode. All or some of these ionically separated electrodes may be selected, e.g. by being cut out from the rest of the substrate, and used in an electrochemically active device.

In other words, the electrolyte thickness is preferably adjusted to the desired yield of the manufacturing process. Based on the teaching in this document the skilled man can easily try different thicknesses until he gets a desired yield.

FIG. 4 is a microscope close-up of a sample wherein the all intermediate portions are substantially free of electrolytes. As can be seen in the FIG. some electrolyte is present on the intermediate portions, but it is not enough to substantially affect the properties of the electrodes.

FIG. 5 is used to illustrate different terms used here in. In the FIGURE there are four equally sized electrodes, each having a surface area of $a*a=a^2$. The electrodes are separated by a distance b, i.e. the electrode-to-electrode distance or the separating gap is b. The pitch of the electrodes is c. Consequently, the area ratio is $a^2/c^2-a^2$, the length ratio is $a/b$ and the fill factor is $a^2/c^2*100$.

In order to determine the effect of the electrode to electrode distance two samples were prepared. For both samples (A) Melinex 454 was used as the substrate, (a) carbon paste 7102 from DuPont was screen printed. The electrode areas were 1×1 mm² or 1×1 cm², respectively for the different samples. Both samples had a separating gap between two electrodes of 1 mm in both cases. Luviquat Excellence, into which 10 wt.-% $TiO_2$ was immersed, was used as the white and opaque electrolyte. Wire-bar #6 (R. D. Specialties, Inc.) was used throughout this experiment, giving a wet film thickness of about 16 μm.

The sample having an electrode area of 1 cm² is illustrated in FIG. 6a (by a microscope close up) providing a yield of 100% and the electrodes are fully covered by electrolyte. The sample having an electrode area of 1 mm² is illustrated in FIG. 6b (by a microscope close up), providing a yield of 100% and substantially fully covered electrodes. Consequently, the area ratio has a minor impact on the yield of the production process.

The invention has mainly been described with reference to main embodiments. However, embodiments other than the ones disclosed above are equally possible within the scope of the invention, as defined by the appended patent claims. All terms used in the claims are to be interpreted according to their ordinary meaning in the technical field, unless explicitly defined otherwise herein. All references to "a/an/the [element, means, component, member, unit, step etc.]" are to be interpreted openly as referring to at least one instance of said element, means, component, member, unit, step etc. The steps of the methods described herein do not have to be performed in the exact order disclosed, unless explicitly specified.

The invention claimed is:

1. A process for manufacturing of at least a part of an electrochemically active device comprising performing the following steps in sequence directly following each other:
   providing a prefabricated substrate (110) comprising an electrode receiving surface portion (111) having a substantially constant first wetting tension throughout said electrode receiving surface portion,
   providing a plurality of first electrodes (120) directly on said electrode receiving surface portion having a substantially constant first wetting tension of the prefabricated substrate, wherein the surfaces of said plurality of electrodes have a second wetting tension,
   leaving intermediate portions (130) of said electrode receiving surface portion (111) free from said electrodes,
   providing a printable electrolyte (140) having a first corresponding surface tension,
   arranging said printable electrolyte as a layer of electrolyte (140) directly on each one of said plurality of electrodes, wherein the electrolyte (140) is applied as a layer covering said plurality of first electrodes (120) and said intermediate portions (130), and
   awaiting a self-patterning of the electrolyte,
   wherein
   said first wetting tension of said substrate is lower than or equal to said first corresponding surface tension of said electrolyte, and
   said second wetting tension of said electrodes is higher than said first corresponding surface tension of said electrolyte,
   which provides the self-patterning of the electrolyte.

2. A process according to claim 1, wherein the viscosity of the electrolyte is lower than 7000 mPa s, or lower than 6000 mPa s, or lower than 3000 mPa s, or lower than 1000 mPa s, or lower than 500 mPa s.

3. A process according to claim 1, wherein the material of the first electrodes has a wetting tension larger than 73 mN/m, and the material of the electrode receiving surface portion has a wetting tension of at least 38 mN/m.

4. A process according to claim 1, wherein the adhesion energy of the surface of the printed first electrodes is larger than 10 mJ/m² relative deionized water, and the material of the electrode receiving surface portion has a wetting tension of at least 38 mN/m.

5. A process according to claim 1, wherein the electrolyte has a corresponding surface tension higher than 42 mN/m, or a corresponding surface tension between 43 mN/m and 73 mN/m.

6. A process according to claim 1, wherein the thickness of the electrodes is between 0.01 μm and 100 μm, or between 0.05 μm and 50 μm, or between 1 μm and 20 μm.

7. A process according to claim 1, wherein said prefabricated substrate is flexible.

8. A process according to claim 1, wherein said layer of electrolyte is applied as one unitary layer covering said plurality of first electrodes and said intermediate portions, and wherein said layer of electrolyte is preferably applied as a substantially uniform layer.

9. A process according to claim 1, wherein said step of providing said plurality of first electrodes comprises providing the electrodes by means of printing or coating.

10. A process according to claim 1, wherein the layer of electrolyte comprises smaller and substantially larger ion-complexes, where the smaller ion-complexes have a negative electric charge and the larger ion-complexes have a positive electric charge, and/or wherein said electrolyte is a polyelectrolyte comprising poly-cations.

11. A process according to claim 1, wherein the prefabricated substrate further comprises a first portion and a second portion being different from said first portion, and wherein the process further comprising the step of extracting said first portion of the prefabricated substrate from said second portion of the prefabricated substrate and providing said first portion for use in an electrochemically active device.

12. A process according to claim 11, wherein said step of extracting said first portion of the prefabricated substrate from said second portion of the prefabricated substrate, comprises extracting a first portion of the prefabricated substrate comprising at least 5×7 electrodes arranged in a matrix configuration.

13. A process according to claim 1, wherein the part of an electrochemically active device is used when assembling an electrochromic display device.

14. A process for manufacturing an electrochemically active device comprising:
    manufacturing of a part of an electrochemically active device according to the method of claim 1;
    providing a plurality of second electrodes (125), wherein said layer of electrolyte (140) is sandwiched between pairs of one first electrode (121) and one second electrode (126), and wherein the electrolyte is in ionic contact with both the first electrode (121) and the second electrode (126) of the respective pairs of one first electrode (121) and one second electrode (126).

15. A process for manufacturing an electrochemically active device according to claim 14, wherein said one first electrode is selected from said plurality of first electrodes, and said one second electrode is selected from said plurality of second electrodes.

16. A process according to claim 14, wherein in the step of providing a plurality of second electrodes, each first electrode in said plurality of first electrodes (120) and/or each second electrode in said plurality of second electrodes (125) comprises electrochemically active material.

17. The process according to claim 9, wherein the plurality of first electrodes is provided by means of a technique selected from the group consisting of screen printing, wire-bar coating, knife coating, bar coating, spin coating, dip coating and spray coating.

* * * * *